US005603841A

United States Patent [19]

Kerr

[11] Patent Number: 5,603,841

[45] Date of Patent: Feb. 18, 1997

[54] HYDROPHOBICALLY-MODIFIED POLYMERS FOR DEWATERING IN MINING PROCESSES

[75] Inventor: E. Michael Kerr, Aurora, Ill.

[73] Assignee: Nalco Chemical Company, Naperville, Ill.

[21] Appl. No.: 558,573

[22] Filed: Oct. 31, 1995

[51] Int. Cl.[6] .......... C02F 11/14

[52] U.S. Cl. .......... 210/727; 210/728; 210/734; 210/778; 209/5

[58] Field of Search .......... 209/5; 210/725, 210/727, 728, 734, 735, 778

[56] References Cited

U.S. PATENT DOCUMENTS

| | | | |
|---|---|---|---|
| Re. 28,807 | 5/1976 | Panzer et al. | 210/736 |
| Re. 28,808 | 5/1976 | Panzer et al. | 210/736 |
| 2,926,161 | 2/1960 | Butler et al. | 260/89.7 |
| 4,151,202 | 4/1979 | Hunter et al. | 526/310 |
| 4,792,406 | 12/1988 | Allenson et al. | 210/734 |
| 5,116,514 | 5/1992 | Bhattacharyya et al. | 210/712 |
| 5,283,306 | 1/1994 | Ramesh et al. | 526/312 |
| 5,476,522 | 12/1995 | Kerr et al. | 210/734 |
| 5,518,634 | 5/1996 | Pillai et al. | 210/727 |
| 5,529,588 | 6/1996 | Sommese et al. | 210/733 |

*Primary Examiner*—Peter A. Hruskoci
*Attorney, Agent, or Firm*—Robert A. Miller; James J. Drake; Patricia A. Charlier

[57] ABSTRACT

The invention is a method for dewatering waste solids generated in mineral processing operations utilizing a hydrophobically-modified copolymer coagulant of diallyldimethyl ammonium chloride and quaternized dimethylaminoethyl acrylate or quaternized dimethylaminoethyl methacrylate.

8 Claims, No Drawings

HYDROPHOBICALLY-MODIFIED POLYMERS FOR DEWATERING IN MINING PROCESSES

FIELD OF THE INVENTION

The invention is a method for dewatering waste solids generated in mineral processing operations utilizing a hydrophobically-modified copolymer coagulant of diallyldimethyl ammonium chloride and quaternized dimethylaminoethyl acrylate or quaternized dimethylaminoethyl methacrylate.

BACKGROUND OF THE INVENTION

This invention is directed to an improved method for the dewatering of waste solids generated in mineral processing operations on mechanical filter or separation devices. In processes of this type, solids are typically treated to concentrate them, using mechanical means which are assisted by the application of water soluble coagulants and flocculants. Such materials such as thickened coal refuse slurry solids; thickened copper ore refuse slurries; precious metals refuse slurries; taconite refuse slurries; trona refuse underflow slurries; titania refuse underflow slurries; sand and clay refuse generated from the mining, crushing and grinding of construction materials; clay slurries; and wastes from the treatment of bauxite must be concentrated and dewatered prior to disposal or other disposition of such wastes. Often, these materials contain as little as 0.5% solids to 20% solids. These materials may have undergone initial treatment, such as is generally the case in dealing with coal and copper ore refuse slurries, to bring the concentration of solids to 20% to 35% by weight.

The normal treatment for these types of concentrated wastes is to mechanically dewater such slurries with the aid of coagulants and flocculants. Often, the concentrated slurries while being subjected to mechanical dewatering are first treated with a flocculant, generally a high molecular weight anionic material, followed by the application of a coagulating amount of a water-soluble cationic coagulant material.

The typical equipment used for mineral solids dewatering includes twin belt press, disc, gravity, vacuum, rotary table (Bird), sand, drum, string, and plate and frame filters. However, one of the most prominent means of dewatering waste mineral solids involves the use of the twin belt press.

The twin belt press is a filtration device that uses a combination of gravity and pressure dewatering. These are four basic operational stages in a twin belt press. (1) Pretreatment of the slurry, (2) Gravity drainage of free water, (free drainage zone) (3) Wedge zone, and (4) High pressure zone (S-rolls).

Good chemical conditioning is the key to successful and consistent performance of the belt press, as it is for other dewatering processes. In the pretreatment stage, the slurry is treated with chemicals which increase the free water and stabilize the slurry so it stays on the belt. As the slurry is fed onto the filter media, the formation of a uniform evenly-distributed slurry is essential to successful operation of the free drainage, wedge, and pressure zones.

The gravity stage allows free drainage of the water to the point where pressure can be applied to the slurry. Failure to remove the free water in the gravity zone will result in a cake that extrudes (squeezes) off the press as pressure is applied. In the wedge zone, the pressure applied to the cake is gradually increased, further stabilizing the slurry in preparation for the high pressure zone. The cake is then wrapped around a series of S-rolls. The radius of each S-roll is progressively smaller, hence greater pressure, causing increased water release and allowing greater compaction of the cake. The tension of the belt also affects the applied pressures in the high pressure zone. Cake discharge is accomplished over a discharge roller assisted by a discharge blade. Failure to sufficiently dewater the slurry at any stage can result in a fluid cake which is expelled off the sides of the belts.

Twin belt filter presses are often used to dewater solids resulting from the processing of mining waste solids which term includes, in some instances, solid separation in the purification of ores. Mining solids from such mining operations as copper ore processing, phosphate rock purification, uranium processing and the like often are dewatered on twin belt filter presses. A particularly important area of mining where twin belt filter presses are used is in the dewatering of coal refuse solids. To improve drainage and reduce high pressure zones, it is common practice in the utilization of twin belt filter presses to first treat the solid suspensions prior to filtration on the twin belt filter press with a flocculant followed by a coagulant. This treatment is often used in conjunction with coal refuse slurries prior to filtration on a twin belt press. A coagulant capable of improving the operational efficiency of twin belt filter presses, particularly in the dewatering of coal refuse solids, would represent a worthwhile advance in the art.

Although some inorganic materials, principally alum and iron salts, are still used as coagulants, water-soluble organic polymers are now commonly used as coagulants. Both naturally occurring and synthetic polymers find use as coagulants and flocculants in the mining industry. The principal natural polymers are starch and guar, both of which are high-molecular weight polymers of simple sugars (i.e,. polysaccharides). Starch is a polymer of glucose consisting of a mixture of linear (amylose) and branched (amylopectin) segments.

Synthetic polymers are advantageous in that they can be tailored to a specific application. Therefore, there is now a wide range of commercially available polymeric coagulants and flocculants of varying charge, composition and molecular weight. The most widely used synthetic coagulants are polydiallyldimethyl ammonium chloride as described in U.S. Pat. No. 2,926,161 and condensation polymers of dimethylamine and epichlorohydrin such as those described in U.S. Pat. Nos. Re. 28,807 and Re. 28,808. These polymers vary greatly in molecular weight, typically ranging from several thousand to as high as 100,000. Condensation polymers are made in solution form, and are available commercially as aqueous solutions containing 1–20 weight percent polymer. Polydiallyldimethyl ammonium chloride is a vinyl addition polymer, which, at the molecular weights used for coagulation, has also been made in solution form. Typical commercially available polydiallyldimethyl ammonium chloride is available in aqueous solutions containing 1–20% by weight polymer.

Dry water-soluble polymers such as dry polydiallyldimethyl ammonium chloride have also been used to dewater coal refuse slurries on twin belt presses. These polymers have met with some success, but to be successful in twin belt and other mechanical dewatering applications, must be first dissolved in water prior to using. Disadvantages of dry polymer are that it produces dust; if not carefully fed, may produce gelled agglomerates which can foul feeding equipment; and is difficult to handle, in that bags of the material must be moved into proximity of the thickener. The polymers of the present invention overcome these deficiencies while providing activities equivalent to or better than those attained using dry polymers.

SUMMARY OF THE INVENTION

The invention is a method for dewatering waste solids generated in mineral processing operations utilizing a hydrophobically-modified copolymer coagulant of diallyldimethyl ammonium chloride and quaternized dimethylaminoethyl acrylate or quaternized dimethylaminoethyl methacrylate.

DESCRIPTION OF THE PREFERRED EMBODIMENTS

According to one embodiment of the invention, the hydrophobic copolymers of the invention are copolymers including diallyldimethylammonium chloride (DADMAC) monomer and a hydrophobic monomer. Preferably, the hydrophobic monomer is selected from an appropriately quaternized dimethylaminoethylacrylate (DMAEA) or dimethylaminoethylmethacrylate (DMAEM).

The quaternized DMAEA and DMAEM monomers may include $C_4$ to $C_{20}$ chloride which may be either aliphatic (e.g., cetyl chloride quaternary (CCQ)) or aromatic (e.g., benzyl chloride quaternary (BCQ)). Cationic monomers may also include sulfate, bromide or other similar quaternaries.

It has been discovered that the performance of poly(DADMAC) can be significantly improved by incorporating a certain degree of hydrophobic nature. Such a hydrophobic modification can be accomplished by copolymerizing DADMAC with hydrophobic monomers, such as: DMAEA.BCQ, DMAEM.BCQ, DMAEA.CCQ, DMAEM.CCQ, and alkyl acrylates, preferably ethylhexyl acrylate.

The hydrophobic polyelectrolyte copolymer preferably comprises a diallyldimethylammonium chloride and a hydrophobic monomer. Preferably, the hydrophobic monomer is one monomer selected from the group consisting of: quaternized dimethylaminoethyl acrylates and quaternized dimethylaminoethylmethacrylates. DMAEA and DMAEM are preferably quaternized using $C_4$ to $C_{20}$ chloride quaternaries or methyl chloride quaternaries. The preferred $C_4$ to $C_{20}$ aromatic and aliphatic chloride quaternaries are benzyl chloride quaternary and cetyl chloride quaternary, respectively. The preferred quaternary ester is an ester of acrylic acid or methacrylic acid, such as ethylhexyl acrylate. Other preferred hydrophobic monomers of the invention include vinylpyrolidone, styrene, vinylformamide, vinylacetamide, vinylpyridine, and vinylmaleimide.

The DADMAC can be prepared in accordance with any conventional manner such as the technique described in U.S. Pat. No. 4,151,202 (Hunter et al.), which issued on Apr. 24, 1979, and which is incorporated herein by reference.

The quaternized dimethylaminoethylacrylate is selected from the group consisting of: dimethylaminoethylacrylates having $C_4$ to $C_{20}$ chloride quaternary. The dimethylaminoethylacrylates having $C_4$ to $C_{20}$ chloride quaternary are preferably either dimethylaminoethylacrylate benzyl chloride quaternary or dimethylaminoethylacrylate cetyl chloride quaternary.

The quaternized dimethylaminoethylmethylacrylate is selected from the group consisting of: dimethylaminoethylmethacrylates having $C_4$ to $C_{20}$ chloride quaternary. The dimethylaminoethylmethylacrylates having $C_4$ to $C_{20}$ chloride quaternary are preferably either dimethylaminoethylmethylacrylate benzyl chloride quaternary or dimethylaminoethylmethacrylate cetyl chloride quaternary.

The diallyldimethylammonium chloride and the hydrophobic monomer are preferably present in a molar ratio in the range from 99:1 to 20:80. The hydrophobic DADMAC copolymers of the invention are described in detail in U.S. Pat. No. 5,283,306, the disclosure of which is herein incorporated by reference.

By way of example, suitable hydrophobically-modified polymer coagulants that may be used in the present invention include hydrophobic coagulants selected from the group consisting of a hydrophobically-modified copolymer of diallyldimethylammonium chloride and a hydrophobically-modified copolymer of acrylamide. More preferably, the hydrophobically-modified diallyldimethylammonium chloride polymer is one copolymer selected from the group consisting of diallyldimethylammonium chloride/dimethylaminoethylacrylate benzyl chloride quaternary, diallyldimethylammonium chloride/dimethylaminoethylacrylate cetyl chloride quaternary, diallyldimethylammonium chloride/dimethylaminoethylmethacrylate benzyl chloride quaternary, and diallyldimethylammonium chloride/dimethylaminoethylmethacrylate cetyl chloride quaternary.

According to another embodiment of the invention, the hydrophobically-modified copolymer of acrylamide is a copolymer of acrylamide and dimethylaminoethylmethacrylate sulfuric acid salt ($DMAEM.H_2SO_4$). More preferably, the copolymer of $DMAEM.H_2SO_4$ and acrylamide ("AcAm") includes from about 15 to about 50 mole percent of $DMAEM.H_2SO_4$ and from about 50 to 85 mole percent of AcAm. DMAEM salts of other mineral acids such as DMAEM.hydrochloride, DMAEM.phosphate, and DMAEM.nitrate, as well as organic acid salts, such as DMAEM.acetate, DMAEM.oxalate, DMAEM.citrate, DMAEM.benzoate and DMAEM.succinate can also be used. In an even more preferred embodiment, the polymer composition is comprised of from about 20 to about 30 mole percent $DMAEM.H_2SO_4$ and from about 7 to about 80 mole percent of AcAm. The hydrophobically-modified AcAm polymers of the invention are described in detail in U.S. Pat. No. 5,116,514, the disclosure of which is incorporated herein by reference.

The flocculant which may be used in this program may be anionic, non-ionic or cationic. Anionic flocculants are exemplified by AcAm/sodium or ammonium (meth)acrylate copolymers, poly(sodium or ammonium(meth)acrylate, AcAm/sodium AMPS copolymers, homo or copolymers of vinylsulfonic acid, and homo or copolymers of maleic acid. Nonionic flocculants include, poly(meth)acrylamide, polyethylene oxide, clays and bentonite. Cationic flocculants include homo or copolymers of DMAEA or DMAEM quats with AcAm.

A semi-batch process is preferably used to make the hydrophobically-modified dispersants and comprises the following steps:

a. adding diallyldimethylammonium chloride to a polymerization reaction vessel in an amount between about 1 to about 19 weight percent;

b. heating the diallyldimethylammonium chloride to a temperature in the range between about 47° C. to about 57° C.;

c. adding a polymer initiator dropwise to the diallyldimethylammonium chloride in an amount between about 0.05 to about 0.40 weight percent;

d. adding a hydrophobically-associating monomer dropwise to the diallyldimethylammonium chloride in an amount between about 3 to about 19 weight percent; and e. heating the mixture of diallyldimethylammonium chloride, polymer initiator and hydrophobically-associating monomer to a temperature in the range between about 47° C. to about 82° C.

Typically, deionized water is added periodically as needed during the polymerization process in a total amount between about 63 to about 88 weight percent. In some instances, it is preferable to mix diallyldimethylammonium chloride with NaCl and deionized water prior to addition to the reaction vessel. The NaCl is added in an amount between about 2 to about 3.5 weight percent and the deionized water is added in an amount between about 1 to about 2.5 weight percent. This diallyldimethylammonium chloride solution has a concentration of diallyldimethylammonium chloride in the range between about 54 to about 59 weight percent.

The diallyldimethylammonium chloride, polymer initiator and hydrophobically-modified monomer are heated at a temperature in the range between about 47° C. to about 57° C. for a period of between about 6 to 8 hours. Thereafter, the temperature of the reaction vessel is increased to about 72° C. to about 82° C. for a period of between about 5 to about 7 hours. After polymerization has been completed, the copolymer product is typically diluted with deionized water, cooled and stored.

The polymerization initiator is selected from the group consisting of 2,2'-azobis(2-amidinopropane) hydrochloride (Vazo® 50), ammonium persulfate, 2,2'-azobis(N,N'-dimethylene isobutylamide) dihydrochloride, and ammonium persulfate/sodium meta bisulfite.

The invention is a process for dewatering waste solids generated in mineral processing operations on a filter with at least one flocculant and at least one coagulant which comprises applying to the waste solids prior to or simultaneously with the application of the waste solids to the filter an effective amount of an anionic water-soluble flocculant having a molecular weight in excess of one million to flocculate the solids followed by a coagulating amount of a diallyldimethylammonium chloride-containing polymer wherein the diallyldimethylammonium chloride-containing polymer is selected from the group consisting of poly(diallyldimethylammonium chloride/dimethylaminoethylacrylate benzyl chloride quaternary), poly(diallyldimethylammonium chloride/dimethylaminoethylacrylate cetyl chloride quaternary), poly(diallyldimethylammonium chloride/dimethylaminoethylmethacrylate benzyl chloride quaternary, poly(diallyldimethylammonium chloride/ethyl hexylacrylate) and poly(diallyldimethylammonium chloride/dimethylaminoethylmethacrylate cetyl chloride quaternary) to coagulate the flocculated solids and then dewatering the waste solids on the filter. In this process, the hydrophobically-modified diallyldimethyl-ammonium chloride-containing polymer can be poly(diallyldimethylammonium chloride/dimethylaminoethylacrylate benzyl chloride quaternary). Further, the hydrophobically-modified diallyldimethyl-ammonium chloride-containing polymer may have from 50–99.5 mole percent diallyldimethyl-ammonium chloride. Preferably, the hydrophobically-modified diallyldimethyl ammonium chloride-containing polymer has from 70–95 mole percent diallyldimethyl-ammonium chloride. Most preferably, the hydrophobically-modified diallyldimethyl-ammonium chloride-containing polymer has from 85–95 mole percent diallyldimethyl-ammonium chloride. The waste solids treated may be coal refuse underflow slurries, copper ore refuse underflow slurries, taconite refuse underflow slurries, titania refuse underflow slurries, trona refuse underflow slurries or sand and gravel. The filter utilized may be a twin belt filter press.

The dosages utilized depend upon the nature of the waste stream to be dewatered.

The following examples are presented to describe preferred embodiments and utilities of the invention and are not meant to limit the invention unless otherwise stated in the claims appended hereto.

EXAMPLE 1

A hydrophobically-modified polyelectrolyte copolymer was formed from diallyldimethylammonium chloride (DADMAC) and dimethylaminoethylmethacrylate cetyl chloride quaternary (DMAEM.CCQ) monomers using a batch process. The following reagents were used:

| | |
|---|---|
| 251.30 grams | 62% Solution of DADMAC |
| 150.00 grams | 20% Solution of DMAEM.CCQ |
| 0.30 grams | Versene |
| 10.00 grams | Adipic Acid |
| 15.00 grams | 25% Solution of Ammonium Persulfate |
| 75.08 grams | Deionized Water |

DADMAC was added to a mixture of DMAEM.CCQ, adipic acid, versene, and deionized water. This reaction mixture was then heated to about 50° C. and thereafter the ammonium persulfate was added. The reactor vessel was purged with nitrogen at 10 psig and stirred at about 250 rpm. After 30 minutes a precipitate began to form so an additional 154.76 grams of a 62% solution of DADMAC, 10 grams of a 25% solution of ammonium persulfate and 0.10 grams of versene were added to the reactor vessel. Thereafter, the temperature of mixture was increased to 65° C. for 6 hours and then cooled to ambient temperature. The final molar ratio of DADMAC to DMAEM.CCQ was 96.68% to 3.32%.

The preparation of DMAEM.CBQ (dimethylaminoethylmethacrylate cetyl bromide quaternary) was effected as follows:

| | |
|---|---|
| 80.00 grams | 97% Cetyl Bromide |
| 40.00 grams | 99% DMAEM |
| 0.08 grams | Hydroquinone |
| 500.00 grams | Ethanol |

The above reactants were combined and heated at reflux for 4 hours. The solvent (i.e., ethanol) was removed under reduced pressure. A gummy liquid upon cooling afforded pale pink colored solid DMAEM.CBQ monomer in 96% yield. This monomer was then dissolved in deionized water to a desired dilution.

The preparation of DMAEM.CCQ was effected by stirring an aqueous solution (25% actives) of DMAEM.CBQ (1,000 grams), prepared as above, with Amberlite IRA-400 (Cl–) ion exchange resin for 30 minutes. The resin was filtered and the monomer used in subsequent polymerizations.

EXAMPLE 2

A hydrophobically-modified polyelectrolyte copolymer was formed from 70% DADMAC and 30% dimethylaminoethylacrylate benzyl chloride quaternary (DMAEA.BCQ) monomers. The following reagents were used:

| | |
|---|---|
| 188.03 grams | 62% Solution of DADMAC |
| 104.28 grams | 80% Solution of DMAEA.BCQ |
| 0.20 grams | Versene |
| 15.00 grams | 25% Solution of Ammonium Persulfate |
| 692.49 grams | Deionized Water |

DADMAC and 100 grams of deionized water were placed within a polymerization reactor vessel which was purged with nitrogen at 10 psig. Thereafter, the ammonium persulfate was added dropwise to the reactor vessel via a syringe pump for 2 hours. Simultaneously, DMAEA.BCQ was added dropwise to the reactor vessel via a syringe pump for 2 hours. The DMAEA.BCQ was diluted with 100 grams of deionized water prior to being loaded into the syringe pump. Thereafter, the remaining deionized water and versene were added to the reactor vessel which was then heated at 65° C. for 6 hours.

EXAMPLE 3

A hydrophobically-modified polyelectrolyte copolymer was formed from 70% DADMAC and 30% dimethylaminoethylacrylate benzyl chloride quaternary (DMAEA.BCQ) monomers. The following reagents were used:

| | |
|---|---|
| 188.03 grams | 62% Solution of DADMAC |
| 104.28 grams | 80% Solution of DMAEA.BCQ |
| 0.20 grams | Versene |
| 1.17 grams | Vazo 50 Initiator |
| 706.00 grams | Deionized Water |
| 0.32 grams | $H_2SO_4$ |

DADMAC was placed within a polymerization reactor vessel which was purged with nitrogen at 10 psig, stirred at 300 rpm and a torque of 350 dynes-cm. The pH was adjusted to 3.5 by addition of $H_2SO_4$. After 40 minutes the torque gradually increased to 2240 dynes-cm. Thereafter, 100 grams of deionized water was added to the DADMAC which reduced the torque to 850 dynes-cm. This was followed by the dropwise addition of Vazo 50 and DMAE-A.BCQ via separate syringe pumps for 2 hours. The DMAE-A.BCQ was diluted with 100 grams of deionized water. The reactor vessel was then heated at 65° C. for 5 hours. After 2 hours and 20 minutes the torque reached 2920 dynes-cm. 100 grams of deionized water as again added which reduced the torque to 1180 dynes-cm. After 3 hours and 15 minutes another 100 grams of deionized water was added to the polymerizing product. After 5 hours another 100 grams of deionized water was added to the reactor vessel and the temperature was raised to 80° C. for 1 hour. Thereafter, the resulting polymer was diluted with the remaining deionized water, cooled and stored.

EXAMPLE 4

A hydrophobically-modified polyelectrolyte copolymer was formed from 80% DADMAC and 20% dimethylaminoethylmethacrylate cetyl chloride quaternary (DMAEM-.CCQ) monomers. The following reagents were used:

| | |
|---|---|
| 188.02 grams | 62% Solution of DADMAC |
| 84.43 grams | DMAEM.CCQ |
| 0.20 grams | Versene |
| 1.17 grams | Vazo 50 Initiator |
| 727.03 grams | Deionized Water |
| 0.15 grams | $H_2SO_4$ |

DADMAC was placed within a polymerization reactor vessel which was purged with nitrogen at 10 psig and stirred at 300 rpm. The pH was adjusted to 3.5 by addition of $H_2SO_4$. 150 ml of deionized water was added to the DADMAC. This was followed by the dropwise addition of Vazo 50 and DMAEA.CCQ via separate syringe pumps for 2 hours. The DMAEA.CCQ was diluted with 100 grams of deionized water. The reactor vessel was then heated at 65° C. for 4.5 hours. Between 1.5 to 2 hours 180 ml of deionized water was again added. After 4.5 hours, the temperature was raised to 70° C. for 0.5 hours. Thereafter, the resulting polymer was diluted with the remaining deionized water, cooled and stored.

EXAMPLE 5

A hydrophobically-modified polyelectrolyte copolymer was formed using the same technique described in Example 4 above from 80% DADMAC and 20% dimethylaminoethylacrylate benzyl chloride quaternary (DMAEA.BCQ) monomers. The following reagents were used:

| | |
|---|---|
| 227.52 grams | 62% Solution of DADMAC |
| 73.68 grams | 80% Solution of DMAEA.BCQ |
| 0.40 grams | Versene |
| 1.42 grams | Vazo 50 Initiator |
| 696.63 grams | Deionized Water |
| 0.35 grams | $H_2SO_4$ |

However, the water was added as needed. Table 1 below sets forth the time of deionized water addition during the semi-batch polymerization process.

TABLE 1

| Speed of Rotation (rpm) | Torque (Dynes-cm) | Time | $H_2O$ Addition |
|---|---|---|---|
| 200 | 400 | 0 | 0 |
| 200 | 850 | 30 min. | 0 |
| 200 | 1200 | 45 min. | 50 grams |
| 200 | 700 | 45.1 min. | — |
| 200 | 1600 | 1 hr. 10 min. | 50 grams |
| 200 | 1000 | 1 hr. 10.1 min. | — |
| 200 | 1510 | 1 hr. 35 min. | 50 grams |
| 200 | 1200 | 1 hr. 35.1 min. | 50 grams |
| 200 | 650 | 1 hr. 35.2 min. | — |
| 200 | 1500 | 1 hr. 55 min. | — |
| 200 | 1610 | 2 hr. 12 min. | 50 grams |
| 200 | 558 | 2 hr. 12.1 min. | — |

EXAMPLE 6

A hydrophobically-modified polyelectrolyte copolymer was formed from 90% DADMAC and 10% diamethylaminoethylacrylate benzyl chloride quaternary (DMAEA.BCQ) monomers. The following reagents were used:

| | |
|---|---|
| 251.79 grams | 67% Solution of DADMAC |
| 39.13 grams | 80% Solution of DMAEA.BCQ |
| 0.20 grams | Versene |
| 3.36 grams | Vazo 50 Initiator |
| 678.00 grams | Deionized Water |
| 27.52 grams | NaCl |

The semi-batch procedure was as follows:

(1) A DADMAC solution was prepared by evaporating a solution comprising: 251.79 grams of a 67% solution of DADMAC, 27.52 grams of NaCl and 16.6 grams of deionized water for 30 minutes.

(2) The polymerization reactor vessel was then purged with nitrogen, stirred at 200 rpm and heated to 57° C.

(3) Then 40 mg of versene were added to the reactor vessel.

(4) 39.13 grams of DMAEA.BCQ were diluted with 15.87 grams of deionized water, then 160 mg of versene were added, stirred and loaded into a syringe pump.

(5) 500 grams of water were disposed in a funnel adjacent to the reactor vessel and nitrogen sparged continuously.

(6) 1.68 grams of Vazo 50 were dissolved in 45.16 grams of deionized water and loaded into another syringe pump.

(7) At 57° C., 11.7 grams of the Vazo 50 solution were added to the reactor vessel, together with the dropwise addition of the DMAEA.BCQ.

(8) Additional deionized water was added from time to time as required.

(9) After 5 hours, the temperature was raised to 82° C. for 1 hour.

(10) Thereafter, the resulting polymer was diluted with the remaining deionized water, cooled and stored.

EXAMPLE 7

The gravity dewatering test is a tool for reliably screening products and evaluating application variables for twin belt press dewatering. Results obtained in testing can generally be directly translated to the plant process. The following procedure outlines suggested steps in performing a thorough test program.

1. An apparatus consisting of a 500 ml graduated cylinder, powder funnel, and plastic collar which retains a filter cloth on the top of the powder funnel, all supported by a ring stand and appropriate clamps was constructed. The filter cloth used was a nylon Filterlink® 400 mesh round orifice cloth of a type similar to that used in commercial practice.
2. Obtain 5–10 gallons of untreated dewatering feed (clarifier underflow) and set up the test apparatus.
3. Using a spatula, hand mix the slurry to uniformly disperse any coarse solids present. Immediately sample and transfer 200 ml of underflow slurry into a 500 ml graduated cylinder. Re-mix the underflow slurry prior to filling each new cylinder.
4. Measure in a syringe and set aside the desired amount of coagulant as 1% solution. Measure and add the desired amount of anionic polymer flocculant stock solution to a 50 or 100 ml graduated cylinder, dilute to a total of 20 ml (or 10% of the underflow slurry volume) with process water, mix thoroughly, and set aside.
5. Invert the 500 ml graduate cylinder containing the 200 ml of underflow slurry 3–4 times to thoroughly disperse the solids, then immediately add the pre-measured flocculant solution from step 3, re-stopper the cylinder and invert 4 times. Duplicate the mixing motion as closely as possible in each test.
6. Immediately add the pre-measured coagulant solution, re-stopper and invert 2 additional times.
7. Pour the conditioned slurry into the plastic collar section of the test apparatus and immediately start a stopwatch. Record the drainage volumes collected every 10 seconds for a time period greater than actual commercial plant process time for gravity drainage. After removing the plastic collar, note the dewatered cake stability and thickness. If the thickness is significantly different from plant conditions, adjust the initial test slurry volume in step 2 accordingly.
8. Repeat testing, adjusting products and dosages to obtain maximum free drainage volumes in the process time allowed. Plot out both volume vs. time and the 10 second volume vs. dosage data as testing proceeds to double-check results. Reasonable data should plot along a relatively smooth curve. Scattered data points indicate either errors or possible sample deterioration.

The procedure detailed above was utilized to obtain the results shown in Table II.

TABLE II

| Polymer | Dose (mls) | 5 Sec Drainage | 10 Sec Drainage | 20 Sec Drainage |
|---|---|---|---|---|
| A | 0.25 | 50 | 68 | 90 |
| | 0.5 | 60 | 82 | 98 |
| | 0.75 | 78 | 95 | 108 |
| B | 0.25 | 44 | 60 | 85 |
| | 0.5 | 56 | 76 | 98 |
| | 0.75 | 65 | 84 | 100 |
| None | | 28 | 38 | 50 |

A = 90/10 mole ratio poly(DADMAC/DMAEA.BCQ) synthesized according to procedure of Example 6.
B = solution poly(DADMAC).

EXAMPLE 8

The experimental procedure described in Example 7 was utilized to obtain the results detailed in Table III.

TABLE III

| POLYMER | MLS/MIN | % ACTIVES | GRAMS/MIN ACTIVES | NTU |
|---|---|---|---|---|
| E | 0 | 15 | 0 | 1774 |
| | 145 | | 21.75 | 780 |
| | 240 | | 36 | 415 |
| | 340 | | 51 | 331 |
| A | 0 | 40 | 0 | 1774 |
| | 20 | | 8 | 620 |
| | 50 | | 20 | 150 |
| | 120 | | 48 | 105 |
| | 240 | | 96 | 35 |

A = 90/10 mole ratio poly(DADMAC/DMAEA.BCQ) synthesized according to procedure of Example 6.
E = Solution poly(DADMAC), 15% actives.

EXAMPLE 9

The experimental procedure described in Example 8 was utilized to obtain the results detailed in Table IV.

TABLE IV

| POLYMER | MLS/MIN | % ACTIVES | GRAMS/MIN ACTIVES | NTU |
|---|---|---|---|---|
| F | 228 | 20 | 45.6 | 275 |
| A | 0 | 40 | 0 | 781 |
| | 60 | | 24 | 227 |
| | 120 | | 48 | 83 |

A = 90/10 mole ratio poly(DADMAC/DMAEA.BCQ) synthesized according to procedure of Example 6.
F = Solution poly(DADMAC), 20% actives.

Changes can be made in the composition, operation and arrangement of the method of the present invention described herein without departing from the concept and scope of the invention as defined in the following claims:

I claim:

1. A process for dewatering solids in underflow slurries generated in mineral processing operations on a filter with at least one flocculant and at least one coagulant which comprises applying to the solids prior to or simultaneously with the application of the solids to the filter an effective amount of an anionic water-soluble flocculant having a molecular weight in excess of one million to flocculate the solids followed by a coagulating amount of a diallyldimethylammonium chloride-containing polymer wherein the diallyldimethylammonium chloride-containing polymer is selected from the group consisting of poly(diallyldimethylammonium chloride/dimethylaminoethylacrylate benzyl chloride quaternary), poly(diallyldimethylammonium chloride/dimethylaminoethylacrylate cetyl chloride quaternary), poly(diallyldimethylammonium chloride/dimethylaminoethylmethacrylate benzyl chloride quaternary, poly(diallyldimethylammonium chloride/ethyl hexylacrylate) and poly(diallyldimethylammonium chloride/dimethylaminoethylmethacrylate cetyl chloride quaternary) to coagulate the flocculated solids and then dewatering the solids on the filter.

2. The process of claim 1 wherein the hydrophobically-modified diallyldimethyl-ammonium chloride-containing polymer is poly(diallyldimethylammonium chloride/dimethylaminoethylacrylate benzyl chloride quaternary), and has from 50–99.5 mole percent diallyldimethyl-ammonium chloride.

3. The process of claim 1 wherein the hydrophobically-modified diallyldimethyl-ammonium chloride-containing polymer is poly(diallyldimethylammonium chloride/dimethylaminoethylacrylate benzyl chloride quaternary), and has from 70–95 mole percent diallyldimethyl-ammonium chloride.

4. The process of claim 1 wherein the hydrophobically-modified diallyldimethyl-ammonium chloride-containing polymer is poly(diallyldimethylammonium chloride/dimethylaminoethylacrylate benzyl chloride quaternary), and has from 85–95 mole percent diallyldimethyl-ammonium chloride.

5. The process of claim 1 wherein the solids are selected from the group consisting of copper ore concentrate and copper ore refuse underflow slurries, clean coal and coal refuse underflow slurries, trona refuse underflow slurries, taconite refuse underflow slurries, titania refuse underflow slurries and sand and gravel.

6. The process of claim 1 wherein the filter is a twin belt filter press.

7. The process of claim 1 wherein the filter is selected from the group consisting of disk filters, rotary filters, vacuum belt filters and twin belt filter presses.

8. The process of claim 1 wherein the solids generated in a mineral processing operation are waste solids.

* * * * *